US012779301B2

(12) United States Patent
Chang

(10) Patent No.: US 12,779,301 B2
(45) Date of Patent: Nov. 3, 2026

(54) ROUGH PANEL WITH LOGO LAYER AND RACKET

(71) Applicant: Yu Jen Chang, Taichung (CN)

(72) Inventor: Yu Jen Chang, Taichung (CN)

( * ) Notice: Subject to any disclaimer, the term of this patent is extended or adjusted under 35 U.S.C. 154(b) by 266 days.

(21) Appl. No.: 18/757,624

(22) Filed: Jun. 28, 2024

(65) Prior Publication Data

US 2025/0375680 A1 Dec. 11, 2025

(30) Foreign Application Priority Data

Jun. 6, 2024 (CN) ........................ 202421287000.X

(51) Int. Cl.

*A63B 59/42* (2015.01)
*A63B 102/08* (2015.01)
*G09F 23/00* (2006.01)

(52) U.S. Cl.

CPC .......... *A63B 59/42* (2015.10); *G09F 23/0066* (2013.01); *A63B 2102/08* (2015.10); *A63B 2209/02* (2013.01); *A63B 2209/023* (2013.01)

(58) Field of Classification Search

CPC . A63B 59/42; A63B 2102/08; A63B 2209/02; A63B 2209/023; G09F 23/0066
See application file for complete search history.

(56) References Cited

U.S. PATENT DOCUMENTS

| | | | | |
|---|---|---|---|---|
| 11,925,843 | B1 * | 3/2024 | Bicanic | A63B 59/40 |
| 2021/0252356 | A1 * | 8/2021 | Thurman | A63B 59/42 |
| 2022/0266106 | A1 * | 8/2022 | Nygren | A63B 59/45 |

FOREIGN PATENT DOCUMENTS

| | | | |
|---|---|---|---|
| CN | 217391533 U | * | 9/2022 |

* cited by examiner

*Primary Examiner* — Audrey B. Walter
(74) *Attorney, Agent, or Firm* — Sandy Lipkin

(57) ABSTRACT

The utility model discloses a rough panel with a logo layer and a racket. The rough panel with the logo layer comprises: a carbon cloth layer; and a rough layer arranged on the carbon cloth layer; wherein a logo layer is arranged between the carbon cloth layer and the rough layer, the rough panel is made by die pressing, and the logo layer is embedded in the carbon cloth layer and/or the rough layer. The arrangement of the logo layer between the carbon cloth layer and the rough layer effectively prevents the wear and tear of the logo layer, allowing it to be displayed more effectively.

9 Claims, 4 Drawing Sheets

ROUGH PANEL WITH LOGO LAYER AND RACKET

BACKGROUND OF THE INVENTION

1. Technical Field

The utility model relates to the technical field related to rackets, in particular to a rough panel with a logo layer and a racket.

2. Description of Related Art

Pickleball is a sport that involves hitting a ball with a racket, combining elements of tennis, badminton, and table tennis. It has become a regular sport in middle school physical education classes and is progressively gaining popularity among both young and older people.

In the prior art, the trademark text or design on pickleball and beach ball rackets is typically printed or pasted onto the outer surface of the racket, making it vulnerable to wear and tear when hitting the ball.

BRIEF SUMMARY OF THE INVENTION

The technical problem to be solved by the utility model is to provide a rough panel and racket with a logo layer that effectively reduces wear and tear.

The objective of the utility model is achieved through the following technical scheme.

A rough panel with a logo layer comprises: a carbon cloth layer; and a rough layer arranged on the carbon cloth layer; wherein a logo layer is arranged between the carbon cloth layer and the rough layer, the rough panel is made by die pressing, and the logo layer is embedded in the carbon cloth layer and/or the rough layer.

Further, the logo layer adopts a unicolor or multicolor label, and the label is in the shape of trademark characters or patterns.

Further, the label is made of carbon fiber and/or glass fiber.

Further, the label is made of poly (p-phenylene terephthalamide).

Further, the carbon cloth layer is made of carbon cloth impregnated with epoxy resin by die pressing.

Further, the rough layer is made of release cloth impregnated with epoxy resin by die pressing and then peeling off the release cloth.

Another aspect of the utility model provides a racket, comprising cover plates made of the rough panel with the logo layer as described above, a handle part and a racket part, wherein the racket part is fixedly connected to the handle part, the handle part comprises a handle, the racket part comprises a frame and a core board, the handle and the frame are integrally molded into a main frame body, the main frame body is provided with a mounting position, the core board is detachably arranged in the mounting position, and the cover plates are detachably arranged on the main frame body.

Further, two cover plates are provided, each of the cover plates comprises a panel and a border, the border is integrally molded along edges of the panel, the two cover plates are mounted on the main frame body from two sides of the racket part, and the borders of the two cover plates are matched to cover an outer side of the frame.

Further, an inner side of the cover plate is provided with a removable adhesive layer, and a thickness of the adhesive layer ranges from 20 to 150 μm.

Further, the core board comprises a composite board made by stacking any two or more of PP board, EVA board and cork board.

According to the utility model, the arrangement of the logo layer between the carbon cloth layer and the rough layer effectively prevents the wear and tear of the logo layer, allowing it to be displayed more effectively; moreover, the logo layer can be embedded into the carbon cloth layer and/or the rough layer by die pressing, which prevents protrusions in the rough layer at positions corresponding to the logo layer, thus allowing the rough panel to be used for making beach ball or pickleball rackets, ensuring the overall integrity of the rough panel while also providing better strength; besides, when the rough panel is made into a racket, the rough layer can effectively increase the spin speed of a cut shot, allowing for a good cut shot effect.

Figure 1:
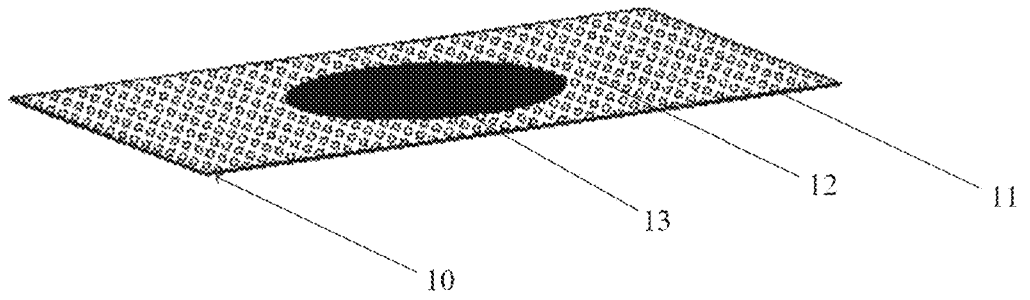
FIG. 1 is a structural diagram of a rough panel according to an embodiment of the utility model.

In the drawings: 10. rough panel; 11. carbon cloth layer; 12. rough layer; 13. logo layer; 20. racket; 21. frame; 22. core board; 221. PP honeycomb board; 222. cork board; 23. cover plate; 231. flat plate; 232. border; 233. adhesive layer; 24. mounting position; 25. main frame body; 30. handle part; 31. handle.

DETAILED DESCRIPTION OF THE INVENTION

In the description of the utility model, it should be understood that directional or positional relationships indicated by the terms such as "center", "transverse", "upper", "lower", "left", "right", "vertical", "horizontal", "top", "bottom", "inner" and "outer" are based on the directional or positional relationships shown in the drawings, which are only for the convenience of describing the utility model and simplifying the description, but do not indicate or imply that the referred devices or elements must have a specific orientation or be constructed and operated in a specific orientation, so they cannot be understood as limiting the utility model. In addition, the terms "first" and "second" are only used for the descriptive purpose, and cannot be understood as indicating or implying relative importance or implicitly indicating the number of indicated technical features. Therefore, the features defined with "first" and "second" may explicitly or implicitly include one or more of the features.

In the description of the utility model, "a plurality of" means two or more, unless otherwise specifically defined. In addition, the term "include" and any variations thereof are intended to cover non-exclusive inclusion.

In the description of the utility model, it should be noted that the terms "mount" and "connect" should be understood in a broad sense unless otherwise specified and defined. For example, it can be fixed connection, detachable connection or integrated connection; it can be mechanical connection or electric connection; and it can be direct connection, indirect connection through intermediate media or internal communication of two elements. For those of ordinary skill in the art, the specific meanings of the above terms in the utility model may be understood according to specific situations.

The utility model will be further explained with reference to the attached drawings 1-4 and preferred embodiments.

Figure 2:
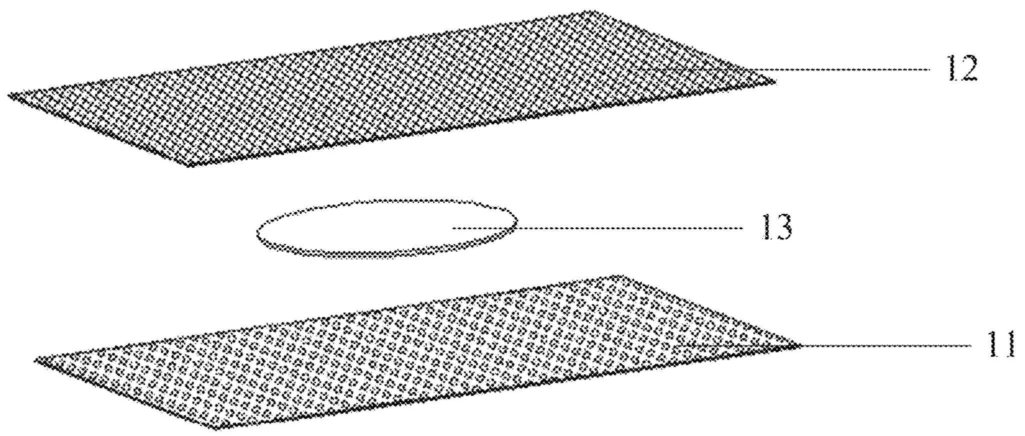
FIG. 2 is an explosive view of a rough panel according to an embodiment of the utility model.

As shown in FIGS. 1 and 2, this embodiment discloses a rough panel 10 with a logo layer 13, comprising: a carbon cloth layer 11; and a rough layer 12 arranged on the carbon cloth layer 11; wherein a logo layer 13 is arranged between the carbon cloth layer 11 and the rough layer 12, the rough panel 10 is made by die pressing, and the logo layer 13 is embedded in the carbon cloth layer 11 and/or the rough layer 12.

The arrangement of the logo layer 13 between the carbon cloth layer 11 and the rough layer 12 effectively prevents the wear and tear of the logo layer 13, allowing it to be displayed more effectively; moreover, the logo layer 13 can be embedded into the carbon cloth layer 11 and/or the rough layer 12 by die pressing, which prevents protrusions in the rough layer 12 at positions corresponding to the logo layer 13, thus allowing the rough panel 10 to be used for making beach ball or pickleball rackets 20, ensuring the overall integrity of the rough panel 10 of cover plates 23 while also providing better strength; besides, when the rough panel 10 is made into a racket 20, the rough layer 12 can effectively increase the spin speed of a cut shot, allowing for a good cut shot effect.

Here, the logo layer 13 adopts a unicolor or multicolor label, and the label is in the shape of trademark characters or patterns. Generally, the logo layer 13 adopts a label in colors different from carbon cloth to give prominence to the trademark characters or patterns, allowing for better display of the trademark on the racket 20 without being worn out due to hitting the ball.

Here, the label is made of carbon fiber and/or glass fiber, and the label made of carbon fiber and/or glass fiber is better than paper materials in strength, impact resistance and fracture safety, and can be better fixed between the carbon cloth layer 11 and the rough layer 12 by die pressing. Alternatively, the label is attached to a sweet point to create distinct hitting effects based on structural features such as intensity, elasticity, hardness, friction, or sound of a hitting surface of the racket 20 in the sweet point, such as variations in the tactile sensation or sound produced upon hitting.

Here, the label is made of poly (p-phenylene terephthalamide), which is known as Kevlar in international markets and as Taparan in domestic markets.

Here, the carbon cloth layer 11 is made of carbon cloth impregnated with epoxy resin by die pressing, which can effectively improve the strength and ductility of the rough panel 10, provide better impact resistance, and prevent complete separation after fracture, thus improving the safety factor.

Here, the rough layer 12 is made of release cloth impregnated with epoxy resin by die pressing and then peeling off the release cloth. After being solidified and molded, the release cloth impregnated with epoxy resin can be easily torn off and a rough woven pattern is formed on a surface of the rough panel 10. When the rough panel 10 is made into the racket 20, the rough layer 12 can effectively increase the spin speed of a cut shot, allowing for a good cut shot effect.

Figure 3:
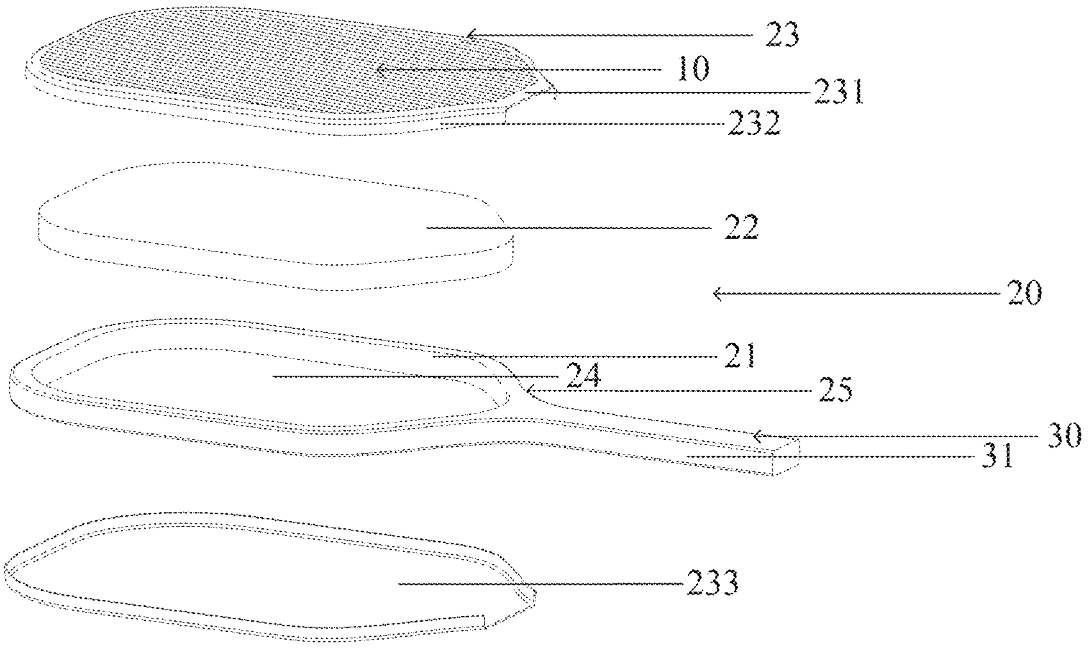
FIG. 3 is a structural diagram of a racket according to an embodiment of the utility model.

Referring to FIG. 3, another embodiment of the utility model provides a racket 20, comprising cover plates 23 made of the rough panel 10 as described above, a handle part 30 and a racket part, wherein the racket part is fixedly connected to the handle part 30, the handle part 30 comprises a handle 31, the racket part comprises a frame 21 and a core board 22, the handle 31 and the frame 21 are integrally molded into a main frame body 25, the main frame body 25 is provided with a mounting position 24, the core board 22 is detachably arranged in the mounting position 24, and the cover plates 23 are detachably arranged on the main frame body 25.

By detachably mounting the core board 22 and the cover plates 23 on the main frame body 25, both the core board 22 and the cover plates 23 can be replaced according to the needs of users. Different combinations of the core board 22 and the cover plates 23 allow for distinct hitting effects based on structural features such as intensity, elasticity, hardness, friction, or sound of a hitting surface of the racket 20, such as variations in the tactile sensation or sound produced upon hitting. Moreover, the main frame body 25 is made by integrally molding the handle 31 and the frame 21, which can further reduce the components required to assemble the racket 20, making the assembly of the racket 20 and the replacement of the core board 22 and the cover plates 23 easier. Of course, the main frame body 25 can also be replaced according to the needs of users, and the racket 20 can be applied to pickleball rackets, beach tennis rackets, and more.

Here, two cover plates 23 are provided, each of the cover plates 23 comprises a flat plate 231 and a border 232, the border 232 is integrally molded along edges of the flat plate 231, and a chamfer is arranged between the flat plate 231 and the border 232, so as to better fit the main frame body 25 and ensure excellent usability. The two cover plates 23 are mounted on the main frame body 25 from two sides of the racket part, and the borders 232 of the two cover plates 23 are matched to cover an outer side of the frame 21. As the two cover plates 23 are attached to the main frame body 25 from both sides of the racket part, it is possible to effectively seal and shield the entirety of the main frame body 25 and the core board 22, thereby further ensuring stable mounting of the core board 22.

Here, an inner side of the cover plate 23 is provided with a removable adhesive layer 233, and a thickness of the adhesive layer 233 ranges from 20 to 150 μm, generally 50 μm, so that an overall thickness of the racket 20 can be effectively reduced while ensuring a good adhering effect. The thickness of the adhesive layer 233 can be determined according to a thickness of the related core board 22. By arranging the removable adhesive layer 233 which may be made of removable double faced adhesive tape on the inner surface of the cover plate 23, users can easily replace the cover plate 23 according to their own needs, thus better fulfilling their usage requirements.

Here, the core board 22 comprises a composite board made by stacking any two or more of PP board, EVA board and cork board. The EVA board has better elasticity and can effectively reduce noise, and the PP board has better strength and good hitting ability. Users can choose according to their needs. It is also possible to form a composite board based on the characteristics of EVA board, PP board, cork board or balsa wood board to better meet usage requirements. PP honeycomb board may be used as the PP board. Moreover, different material combinations of the core board 22 and the cover plates 23 allow for distinct hitting effects based on structural features such as intensity, elasticity, hardness, friction, or sound of a hitting surface of the racket 20, such as variations in the tactile sensation or sound produced upon hitting.

Figure 4:
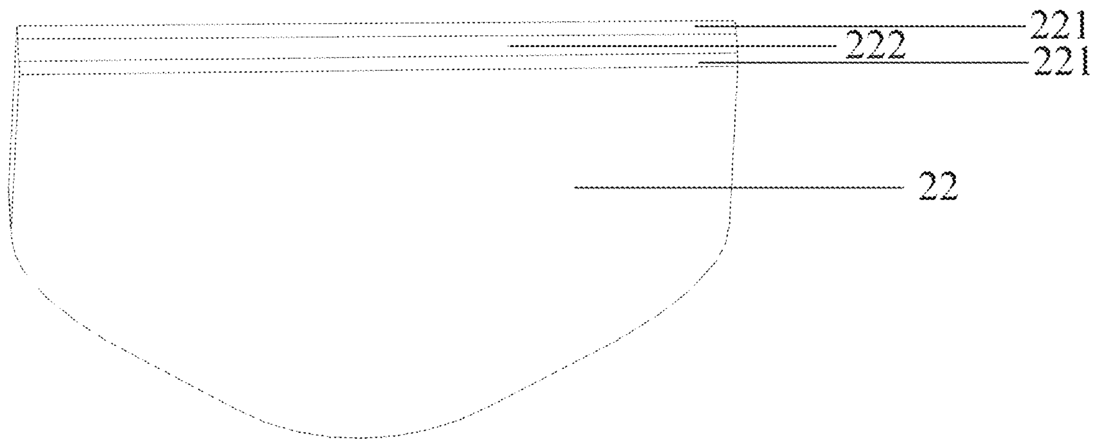
FIG. 4 is a structural diagram of a core board according to an embodiment of the utility model.

As shown in FIG. 4, the core board adopts a three-layer composite structure, and a cork board is arranged between PP honeycomb boards 221 to form a composite board, thus ensuring the overall lightness of the racket 20 and achieving a good hitting effect. Through the arrangement of the cork board 222, the weight of the racket 20 can be effectively reduced, so that the racket 20 is more comfortable to use and has good elasticity and compressibility, which enables rapid compression and rebound during hitting, ensuring a superior hitting sensation. In addition, the core board 22 delivers excellent support while providing superior sound insulation, effectively limiting impact noise. Further, the cork board 222 is eco-friendly and features strong wear resistance and a high level of recovery, even under compression. Alternatively, the cork board 222 can be replaced with an EVA board. Additionally, the flat plate 231 not only offers effective protection for the core board 22 but also enhances the friction between the face of the racket 20 and a pickleball, thereby increasing the spin speed of the pickleball and enhancing the tactile experience during swings.

The above is a further detailed description of this utility model combined with specific preferred embodiments, and it cannot be considered that the specific implementation of this utility model is limited to these descriptions. For those of ordinary skill in the art to which this utility model belongs, under the premise of not deviating from the concept of this utility model, several simple deductions or substitutions can be made, all of which should be regarded as belonging to the protection scope of this utility model.

What is claimed is:

1. A racket, comprising:

a handle part;

a racket part; and cover plates each comprising a rough panel and a logo layer;

wherein the rough panel comprises a carbon cloth layer and a rough layer arranged on the carbon cloth layer;

wherein the logo layer is arranged between the carbon cloth layer and the rough layer, and the rough panel is made by die pressing;

wherein the racket part is fixedly connected to the handle part, the handle part comprises a handle, and the racket part comprises a frame and a core board;

wherein the handle and the frame are integrally molded into a main frame body, the main frame body is provided with a mounting position, and the core board is detachably arranged in the mounting position;

wherein the cover plates are detachably arranged on the main frame body.

2. The racket according to claim 1, wherein two of the cover plates are provided, each of the cover plates further comprises a border;

wherein the border is integrally molded along edges of the rough panel, the two cover plates are mounted on the main frame body from two sides of the racket part; and wherein the borders of the two cover plates are matched to cover an outer side of the frame.

3. The racket according to claim 1, wherein an inner side of each of the cover plates is provided with a removable adhesive layer, and a thickness of the adhesive layer ranges from 20 to 150 μm.

4. The racket according to claim 1, wherein the core board comprises a composite board made by stacking any two or more of a polypropylene (PP) board, an ethylene-vinyl acetate (EVA) board and a cork board.

5. The racket according to claim 1, wherein the carbon cloth layer is made of carbon cloth impregnated with epoxy resin by die pressing.

6. The racket according to claim 1, wherein the rough layer is formed by impregnating a release cloth with an epoxy resin, subjecting the impregnated release cloth to compression molding, and removing the release cloth after curing to obtain the roughened layer.

7. The racket according to claim 1, wherein the logo layer adopts a unicolor or multicolor label, and the label is in the shape of trademark characters or patterns.

8. The racket according to claim 7, wherein the label is made of at least one of carbon fiber and glass fiber.

9. The racket according to claim 7, wherein the label is made of poly (p-phenylene terephthalamide).

* * * * *